United States Patent
Chen et al.

(10) Patent No.: US 10,101,560 B2
(45) Date of Patent: Oct. 16, 2018

(54) SYSTEMS AND METHODS FOR FOCUSING ON OBJECTS TO CAPTURE IMAGES THEREOF

(71) Applicant: MediaTek Inc., Hsin-Chu (TW)

(72) Inventors: Cheng-Che Chen, New Taipei (TW); Mu-Hsing Wu, Zhubei (TW); Yu-Ming Wei, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 479 days.

(21) Appl. No.: 14/845,957

(22) Filed: Sep. 4, 2015

(65) Prior Publication Data

US 2017/0068069 A1    Mar. 9, 2017

(51) Int. Cl.
| | |
|---|---|
| *G02B 7/40* | (2006.01) |
| *G02B 7/08* | (2006.01) |
| *G01S 15/08* | (2006.01) |
| *G01S 15/02* | (2006.01) |
| *G01S 15/42* | (2006.01) |
| *H04N 5/232* | (2006.01) |
| *G01S 7/52* | (2006.01) |

(52) U.S. Cl.
CPC ............ *G02B 7/40* (2013.01); *G01S 7/52004* (2013.01); *G01S 15/08* (2013.01); *G02B 7/08* (2013.01); *H04N 5/23212* (2013.01)

(58) Field of Classification Search
CPC .... G01S 7/52004; G01S 15/08; G01S 15/025; G01S 15/42; G02B 7/08; G02B 7/40; H04N 5/23212
See application file for complete search history.

(56) References Cited

U.S. PATENT DOCUMENTS

| | | | |
|---|---|---|---|
| 6,178,141 B1 * | 1/2001 | Duckworth | F41H 11/00 367/124 |
| 8,416,317 B2 | 4/2013 | Palum | |
| 2005/0046584 A1 * | 3/2005 | Breed | B60C 11/24 340/13.31 |
| 2014/0157904 A1 | 6/2014 | Amm et al. | |
| 2017/0068069 A1 * | 3/2017 | Chen | G01S 7/52004 |

FOREIGN PATENT DOCUMENTS

| | | | | |
|---|---|---|---|---|
| CN | 103376615 | | 10/2013 | |
| CN | 106506933 A | * | 3/2017 | ......... G01S 7/52004 |
| EP | 1 730 587 | | 9/2010 | |

* cited by examiner

*Primary Examiner* — Daniel Pihulic
(74) *Attorney, Agent, or Firm* — McClure, Qualey & Rodack, LLP

(57) ABSTRACT

A method for focusing on an object to capture an image of that object is provided. The method includes obtaining the travel time between the point in time that an ultrasonic signal is sent and the point in time at which the reflected signal is received. The method also includes obtaining environment information of the electronic device based on location/position information. The method further includes determining local sound speed according to environment information and determining the distance to an object using the local sound speed and the travel time. In addition, the method can include focusing on the object according to the object distance.

22 Claims, 6 Drawing Sheets

SYSTEMS AND METHODS FOR FOCUSING ON OBJECTS TO CAPTURE IMAGES THEREOF

BACKGROUND

Field of the Invention

Embodiments of the invention are generally related to image-capturing electronic devices having an automatic focus mechanism to automatically adjust focus settings.

Description of the Related Art

Nowadays, many kinds of electronic devices are equipped with the ability to capture images. Examples of these electronic devices include digital cameras, mobile phones, media players, media recorders, personal digital assistants (PDAs), tablet personal computers (tablet PCs), laptop computers, etc. For the sake of simplicity, these kinds of electronic devices will be collectively referred to as image-capturing devices in the subsequent disclosure.

These image-capturing devices can use an automatic focus mechanism to automatically adjust focus settings. Automatic focus (hereinafter also referred to as "auto-focus" or "AF") is a feature of some optical systems that allow them to obtain and, in some systems, maintain a continuous, correct focus on a subject, instead of requiring the operator to manually adjust the camera focus. Automatic focus adjusts the distance between the lens and the image sensor to place the lens at the correct distance for the subject being focused on. The distance between the lens and the image sensor to form a clear image of the subject is a function of the distance of the subject from the camera lens.

Although existing methods and devices for automatically adjusting focus setting have been generally adequate for their intended purposes, they have not been entirely satisfactory in all respects. Consequently, it would be desirable to provide a solution for an automatic focus mechanism to get an image with higher image quality.

SUMMARY

One of the objectives of the present disclosure is to provide a method for performing an automatic focusing process that uses ultrasound.

According to one aspect of the disclosure, the method includes obtaining a travel time of an ultrasonic signal between an instant that the ultrasonic signal is transmitted by the electronic device and an instant that the ultrasonic signal is received by the electronic device; obtaining either or both of location/position information and environment information of the electronic device; determining a local sound speed according to either or both of the location/position information and the environment information of the electronic device; determining an object distance between the electronic device and an object according to the local sound speed and the travel time; and focusing on the object according to the object distance.

In one embodiment, the obtaining either or both of location/position information and environment information of the electronic device includes receiving location/position information of the electronic device, and obtaining environment information of the electronic device based, at least in part, on the received location/position information of the electronic device.

In one embodiment, the receiving location/position information of the electronic device is performed by one of GPS, WiFi, BT beacon, GSM, GPRS, and WCDMA.

In one embodiment, the environment information includes temperature data, humidity data, pressure data, wind speed data, and/or wind direction data.

In one embodiment, the obtaining environment information of the electronic device based, at least in part, on the received location/position information of the electronic device includes receiving the environment information of the electronic device corresponding to a location or position indicated by the location or the position information, by connecting to the Internet.

In one embodiment, determining the local sound speed includes referring to a local sound speed look-up table containing local sound speeds corresponding to different environmental data values.

In one embodiment, determining the local sound speed includes determining the local sound speed according to a location/position indicated by the received location/position information.

In one embodiment, the method further includes adjusting a frequency and/or amplitude of the ultrasonic signal according to the travel time.

In one embodiment, the method further comprises obtaining one or more first focusing parameters for focusing in the electronic device according to the object distance. The focusing parameters may include the number of motor steps or a focal distance.

In one embodiment, obtaining one or more first focusing parameters for focusing the electronic device according to the object distance includes referring to a motor steps look-up table containing motor steps corresponding to different object distances.

Another aspect of the present disclosure provides an electronic device having an automatic focus mechanism to automatically adjust focus settings using ultrasound.

The electronic device can include a sound speed analyzer configured to obtain a local sound speed according to either or both of location/position information and environment information of the electronic device; and an object distance detecting module, configured to obtain a travel time of an ultrasonic signal travelling to and from an object, detect an object distance between the electronic device and the object according to the local sound speed and the travel time of the ultrasonic signal, and provide the object distance for focusing on the object according to the object distance.

In one embodiment, the electronic device further includes a transmitter configured to transmit an ultrasonic signal and a receiver configured to receive the ultrasonic signal.

In one embodiment, the object distance detecting module includes a time analyzer configured to calculate the travel time between a transmitted time of the ultrasonic signal and a received time of the ultrasonic signal received by the receiver, and a distance analyzer configured to determine the object distance between the electronic device and the object according to the local sound speed provided by the sound speed analyzer and the travel time provided by the time analyzer.

In one embodiment, the electronic device further includes a lens unit, comprising a lens and a lens driving module configured to move the lens to focus on the object according to the object distance.

In one embodiment, the sound speed analyzer includes a positioning unit, configured to receive the location/position information of the electronic device and a sound speed converter, configured to obtain the local sound speed according to the environment information which is obtained at least based on the location/position information.

In one embodiment, the sound speed analyzer further includes a network unit, configured to access a data base and obtain the environment information from the data base according to the location/position information.

In one embodiment, the positioning unit receives the location/position information by utilizing one or more of GPS, WiFi, BT beacon, GSM, GPRS, and WCDMA.

In one embodiment, the environment information includes temperature data, humidity data, pressure data, wind speed data, and/or wind direction data.

In one embodiment, the object distance detecting module further includes a signal corrector configured to adjust a frequency and/or amplitude of the ultrasonic signal according to the travel time.

In one embodiment, the electronic device further includes an image capturing module, configured to determine a focal distance or a number of motor steps according to the object distance and to focus the object using the focal distance or the number of motor steps.

According to another aspect of the present disclosure, an electronic device is provided. The electronic device includes a time analyzer, configured to obtain a travel time of an ultrasonic signal travelling to and from an object, a positioning unit, configured to receive location/position information of the electronic device, and a sound speed converter, configured to determine a local sound speed according to either or both of the location/position information and environment information of the electronic device, and a distance analyzer, configured to determine an object distance between the electronic device and the object according to the local sound speed and the travel time, and provide the object distance for focusing on the object according to the object distance.

In one embodiment, the electronic device further includes a network unit, configured to obtain the environment information of the electronic device based, at least in part, on the received location/position information of the electronic device.

In the embodiments of the disclosure, the focusing can be performed more accurately and more quickly due to utilizing a local sound speed which is varied in different environments where the electronic device is located. The local sound speed may be obtained by referring to a local sound speed look-up table or one or more formulas using environment information such as temperature. The one or more environment information can be obtained by positioning technologies such as GPS in some embodiments, and by positioning technologies in cooperation with network technologies such as the Internet in other embodiments. In addition, when GPS and/or the Internet are not available, a local sound speed look-up table can still be calibrated and the auto focus method can still be performed. Consequently, feasibility and accuracy of ultrasound focusing can be greatly improved.

BRIEF DESCRIPTION OF THE DRAWINGS

For a more complete understanding of the embodiments, and the advantages thereof, reference is now made to the following descriptions taken in conjunction with the accompanying drawings.

DESCRIPTION OF THE ILLUSTRATIVE EMBODIMENTS

In the following descriptions, an electronic device of the present disclosure will be explained with reference to embodiments thereof. It should be appreciated that these embodiments are not intended to limit the present invention to any specific environment, applications or particular implementations described in these embodiments. Therefore, the description of these embodiments is only for the purpose of illustration rather than to limit the present invention. Furthermore, the attached drawings may be drawn in a slightly simplified or exaggerated way for ease of understanding; the numbers, shapes and dimensional scales of elements depicted may not be exactly the same as those in practical implementations and are not intended to limit the present invention.

Embodiments of the disclosure provide an automatic focus method and an electronic device utilizing ultrasound. In some embodiments, a local sound speed is obtained in real time for detecting an object distance, which can then be utilized to determine a focal distance or a number of motor steps. Due to different local sound speeds can be used to obtain the focal distance or the number of motor steps for different environments, the focus accuracy may be improved.

In some embodiments, networking technologies such as the Internet can be utilized to obtain environment information, which can then be used to obtain the local sound speed. In some embodiments, the environment information can be obtained based on location/position information. In some embodiments, the location/position information can be obtained by utilizing positioning technologies such as one or more of GPS, WiFi, BT beacon, GSM, GPRS, and WCDMA.

Figure 1:
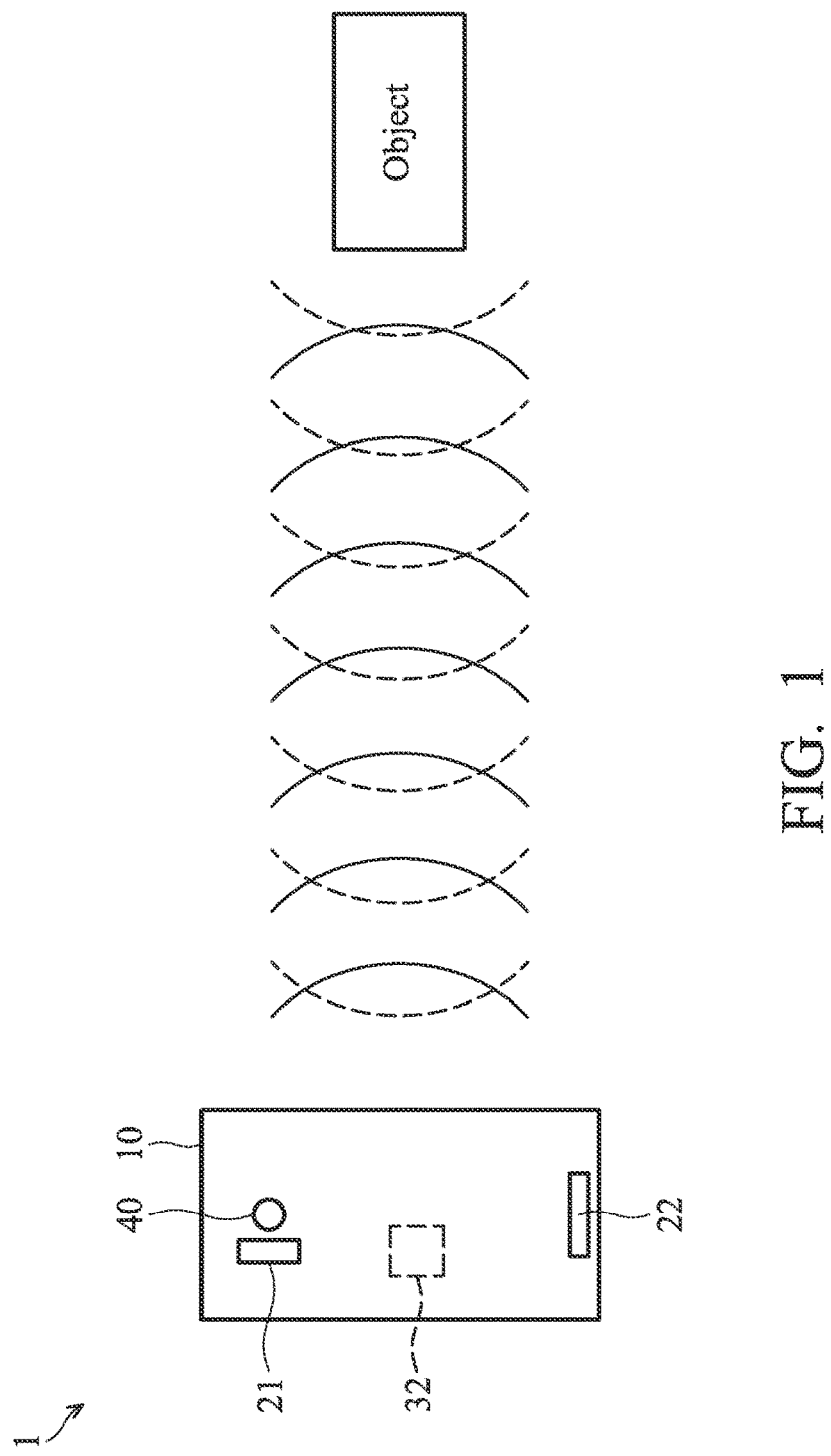
FIG. 1 shows a schematic view of an electronic device used to capture an image of an object, in accordance with one embodiment of the present disclosure.

FIG. 1 shows a schematic view of an electronic device 1, in accordance with some embodiments. The electronic device 1 can be any electronic device capable of capturing images, for example, a mobile phone, a smartphone, or a tablet computer. In the embodiment of the present disclosure, the electronic device 1, represented by block 10, includes a transmitter 21, a receiver 22, a network unit 32, and an image capturing module 40. As shown in FIG. 1, the transmitter 21, the receiver 22, and the image capturing module 40 are disposed as separate components, but they can be partially or wholly integrated.

In the embodiment of the present disclosure, the electronic device 1 is equipped with the ability to capture images, at least by the image capturing module 40. To capture an image of an object, a travel time of an ultrasonic signal can be obtained by calculating a time difference between a transmission of the ultrasonic signal from the transmitter 21 and a reception of the ultrasonic signal, reflected from the object whose image is to be captured, by the receiver 22. Additionally, environment information associated with a position where the electronic device 1 is located can be obtained by the network unit 32, for example, from a remote data base. This environment information can be utilized to determine a local sound speed of the ultrasonic signal. With the travel time and the local sound speed, a focal distance or a number of motor steps for focusing on the object can be determined. The image capturing module 40 is operated accordingly to focus on the object using the focal distance or the number of motor steps, and therefore a clear, focused, and sharp image is produced.

Details of the electronic device 1 in accordance with some embodiments of the disclosure are described below.

Figure 2:
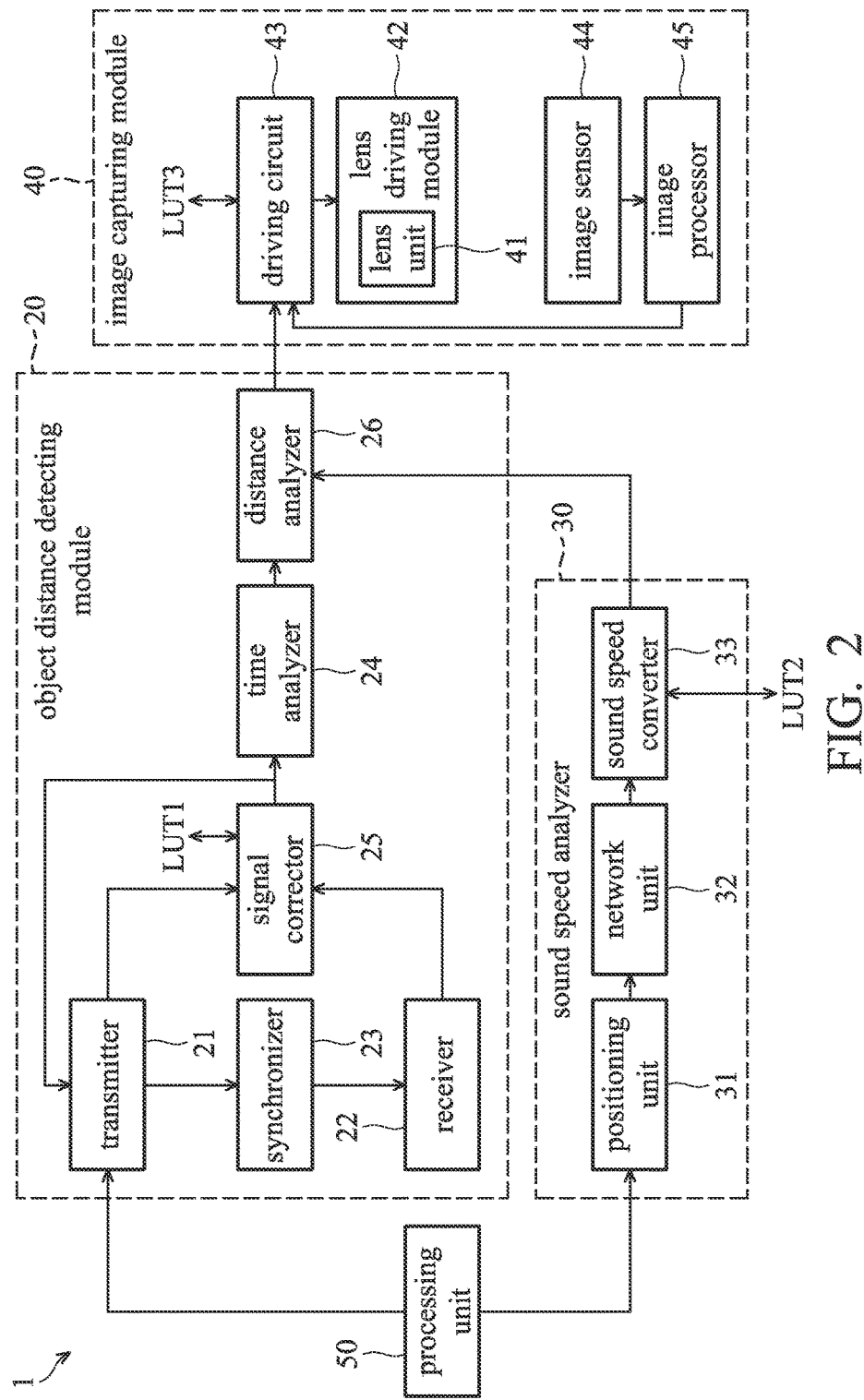
FIG. 2 shows a block diagram of an electronic device, in accordance with one embodiment of the present disclosure.

FIG. 2 shows a block diagram of the electronic device 1 in accordance with some embodiments. The embodiment of FIG. 2 can be applied to the embodiment of FIG. 1 but is not limited thereto.

In the embodiment, the electronic device 1 includes an object distance detecting module 20, a sound speed analyzer 30, an image capturing module 40 and a processing unit 50. The sound speed analyzer 30 is configured to provide a local sound speed. The object distance detecting module 20 is configured to determine an object distance between an object whose image is to be captured and the electronic device 1 according to the local sound speed provided by the sound speed analyzer 30. The image capturing module 40 is configured to focus on the object using a focal distance or the number of motor steps as determined by the object distance received from the object distance detecting module, thereby capturing an image of the object. The processing unit 50 is configured to control the operation of either or both of the object distance detecting module 20 and the sound speed analyzer 30. In an alternative embodiment, the processing unit 50 is also configured to control the operation of the image capturing module 40.

In one embodiment of the present disclosure, as shown in FIG. 2, the object distance detecting module 20, the sound speed analyzer 30, the image capturing module 40 and the processing unit 50 are disposed as separate modules. However, it should be appreciated that other variations and modifications can be made to embodiments of the disclosure. For example, in another embodiment, a part or whole of the object distance detecting module 20, the sound speed analyzer 30, the image capturing module 40 and the processing unit 50 can be partially or wholly integrated. In addition, a part or whole of the object distance detecting module 20, the sound speed analyzer 30, the image capturing module 40 and the processing unit 50 may be integrated into a System-on-a-Chip (SoC) of the electronic device 1. Furthermore, the object distance detecting module 20, the sound speed analyzer 30, the image capturing module 40 and the processing unit 50 may each be implemented as hardware/circuitry or software, or a combination thereof.

FIG. 2 also shows embodiments of a detailed structure for the object distance detecting module 20, the sound speed analyzer 30, and the image capturing module 40.

As shown, one embodiment of the object distance detecting module 20 includes a transmitter 21, a receiver 22, a time analyzer 24, and a distance analyzer 26.

The time analyzer 24 is connected to the transmitter 21 and the receiver 22. The transmitter 21 can transmit an ultrasonic signal towards an object, and the receiver can receive the ultrasonic signal reflected from the object. The time analyzer 24 can be configured to calculate a travel time of the ultrasonic signal, which may be between a transmission time of the ultrasonic signal transmitted by the transmitter 21 and a reception time of the ultrasonic signal received by the receiver 22 to be focused.

The distance analyzer 26 is connected to the time analyzer 24 and is configured to receive signal/data indicating the travel time of the ultrasonic signal from the time analyzer 24. In addition, the distance analyzer 26 is also configured to receive signal/data indicating the local sound speed of the ultrasonic signal from the sound speed analyzer. Accordingly, the distance analyzer 26 can calculate the object distance according to the travel time and the local sound speed.

In addition, the object distance detecting module 20 may further include either or both of a synchronizer 23 and a signal corrector 25. The synchronizer 23 can be connected to the transmitter 21 and the receiver 22 to synchronize the operation of the receiver 22 with the operation of the transmitter 21. For example, the receiver 22 can be operated synchronously with a transmission timing of an ultrasonic signal from the transmitter 21. Additionally or alternatively, the receiver 22 may be synchronized with transmitter 21 to be capable of detecting a particular ultrasonic signal which has the same frequency or magnitude of the ultrasonic signal transmitted by the transmitter 21. On the other hand, the signal corrector 25 can be connected to the transmitter 21 and the receiver 22 and can be configured to adjust the frequency and/or amplitude of the ultrasonic signal transmitted by the transmitter 21.

In the embodiment of the present disclosure, as shown in FIG. 2, the transmitter 21, the receiver 22, the synchronizer 23, the frequency corrector 24, the time analyzer 25, and the distance analyzer 26 are constructed as the object distance detecting module 20. However, it should be appreciated that other variations and modifications can be made to embodiments of the disclosure. For example, in another embodiment, a part or whole of the transmitter 21, the receiver 22, the synchronizer 23, the frequency corrector 24, the time analyzer 25, and the distance analyzer 26 can be disposed separately without being integrated into a single module. Furthermore, a part or whole of the object distance detecting module 20 may be integrated into a System-on-a-Chip (SoC) of the electronic device 1.

As shown, one embodiment of the sound speed analyzer 30 includes a positioning unit 31, a network unit 32, and a sound speed converter 33.

The positioning unit 31 is configured to detect or receive location/position information of the electronic device 1. The positioning unit 31 may receive the location/position information by utilizing any positioning technologies such as one or more of GPS, WiFi, BT beacon, GSM, GPRS, and WCDMA.

The network unit 32 can be connected to the positioning unit 31. In other words, signals/data produced by the positioning unit 31 may be provided to the network unit 32 to be processed. The network unit 32, which may be a networking chip, obtains the environment information of the electronic device 1 based, at least in part, on the received location/position information of the positioning unit 31. The network unit 32 can utilize various networking technologies such as Internet access, IP telephony and local area networking to obtain the environment information.

The sound speed converter 33 is configured to determine the local sound speed according to environment information, which may include the location/position information and/or other environmental information. In one embodiment, the sound speed converter 33 can determine the local sound speed by referring to one or more look-up tables (which may be implemented in any storage/circuit forms) and/or by determining the local sound speed using one or more formulas (which may be implemented in any storage/circuit forms). In the embodiment, the sound speed converter 33 is connected to the network unit 32 and the distance analyzer 26. Signals/data produced by the network unit 32 can be provided to the sound speed converter 33 to be processed. The processing results, indicating the local sound speed, from the sound speed converter 33 are transmitted to the distance analyzer 26 for determining the object distance.

It is noted that in some embodiments or cases, the network unit 32 may not operable or may not be implemented. In such embodiments, the sound speed converter 33 may obtain the local sound speed according to the location/position information directly received from the positioning unit 31, or according to environment information provided by the electronic device 1 itself, such as information measured by a temperature sensor implemented in the electronic device 1.

In other words, in different embodiments, the sound speed converter 33 may obtain the local sound speed according to the either or both of location/position information directly received from the positioning unit 31 and environment information which may be obtained by the network unit 32 or other components of the electronic device 1.

In one embodiment of the present disclosure, as shown in FIG. 2, the positioning unit 31, the network unit 32, and the sound speed converter 33 are integrated into a sound speed updating module 30. In addition, the sound speed analyzer 30 may be controlled by a processing unit 50. However, it should be appreciated that other variations and modifications can be made to embodiments of the disclosure. For example, in another embodiment, a part or whole of the positioning unit 31, the network unit 32, and the sound speed converter 33 can be disposed separately without being integrated into a single module. Furthermore, a part or whole of the sound speed analyzer 30 may be integrated into a System-on-a-Chip (SoC) of the electronic device 1.

As shown in FIG. 2, in the embodiment of the present disclosure, the image capturing module 40 includes a lens driving module 42 which may include a lens unit 41 and a driving circuit 43. In addition, the image capturing module 40 may include either or both of an image sensor 44, and an image processor 45.

The driving circuit 43 can obtain the object distance from the distance analyzer 26 and determine focusing parameters such as a focal distance or a number of motor steps. The driving circuit 43 may include a motor steps converter which can obtain the focal distance or the number of the motor steps according to the object distance. In one embodiment, the driving circuit can determine the focal distance or the number of motor steps by referring to one or more look-up tables (which may be implemented in any storage/circuit forms) and/or by determining the focal distance or the motor steps using one or more formulas (which may be implemented in any storage/circuit forms).

The lens unit 41 may include one or more optical lenses, which may be arranged along one or more optical axes. The lens driving module 42 is configured to drive the lens unit 41 to move according to the focal distance/number of motor steps determined by the driving circuit 43. The lens driving module 42 may include a stepper motor, a voice coil motor, or any other like actuating module.

The image sensor 44 may include a charge-coupled device (CCD) sensor or a complementary metal oxide semiconductor (CMOS) sensor or the like to record the intensity of light as variable charges. The image processor 45 is configured to process and analyze the signals output from the image sensor 44.

As shown in FIG. 2, in the embodiment, the electronic device 1 includes the processing unit 50. For example, the processing unit 50 is configured to transmit manipulation commands to one or more elements in the electronic device 1. The manipulation commands may include signals to initiate the operation of the object-distance detecting module 20, the sound speed analyzer 30, and the image capturing module 40. The processing unit 50 may be connected to a user interface, so the user of electronic device 1 may use the user interface to interactively provide information to the processing unit 50.

Figure 3:
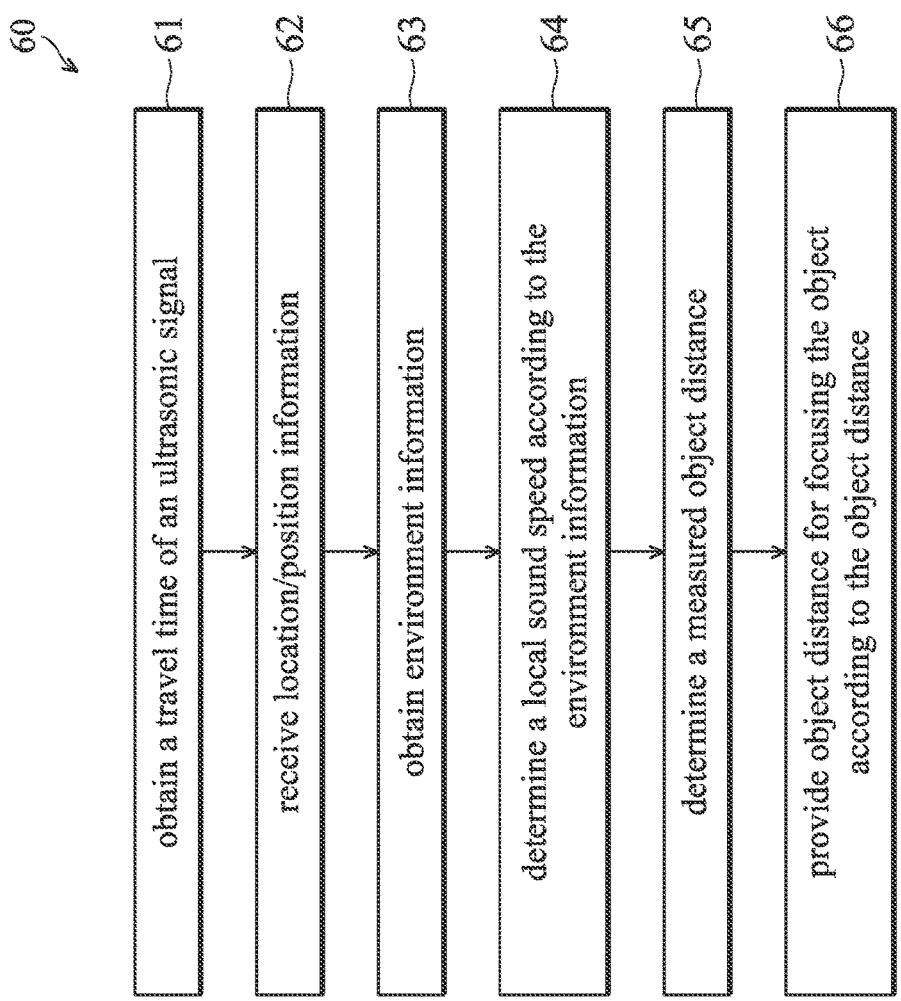
FIG. 3 is a flow chart illustrating an auto-focus method for focusing on an object using ultrasonic techniques, in accordance with one embodiment of the present disclosure.

FIG. 3 is a flow chart illustrating an auto-focus method 60 for focusing on an object using ultrasonic techniques, in accordance with some embodiments. For only purpose of explanation, the flow chart will be described along with the schematic views shown in FIGS. 1-2, but it is not limited thereto. Moreover, the operation of the time analyzer 24, the signal corrector 25, and the distance analyzer 26 may be referred to descriptions for relevant steps in FIG. 3. Although operations are illustrated as different and sequential blocks, they can be combined, replaced, reordered, or eliminated for different embodiments if required.

The method 60 may begin with an operation 61, in which a travel time of an ultrasonic signal to and from an object to be focused on can be obtained. The travel time may be defined as the period between a first point in time, at which an ultrasonic signal is transmitted by the electronic device 1, and a second point in time, at which the ultrasonic signal is received by the electronic device 1. Referring to FIGS. 1 and 2, for example, the transmitter 21 can transmit a signal to the time analyzer 24 as the ultrasonic signal is issued at the first point in time, and the receiver 22 can transmit a signal to the time analyzer 24 as the ultrasonic signal is received at the second point in time. The time analyzer 24 can then calculate the travel time of an ultrasonic signal between the first point in time and the second point in time.

In one embodiment of the present disclosure, a signal adjusting process is performed to improve the accuracy of measuring distance. In the signal correcting process, an object distance between the electronic device 1 and the object can be roughly estimated according to the travel time. The frequency and/or amplitude of the ultrasonic signal transmitted by the transmitter 21 can then be adjusted according to the estimated object distance to be focused. Specifically, when the detected object distance is relatively long, the ultrasonic signal can be adjusted to have a higher frequency and/or a lower amplitude, so that the ultrasonic signal can be transmitted to a more distant place. Conversely, when the detected object distance is short, the ultrasonic signal can be adjusted to have a lower frequency and/or a higher amplitude, so as to improve spatial resolution.

In one embodiment, to adjust a suitable frequency and/or amplitude of the ultrasonic signal for the estimated object distance, the signal corrector 25 may refer to a frequency look-up table LUT1. The frequency look-up table LUT1 may be stored in a memory unit or implemented with any storage/circuit forms and may record suitable frequencies and/or amplitudes of an ultrasonic signal corresponding to different travel times.

In operation 62, location/position information of the electronic device 1 is received. In the embodiment, the positioning unit 31 is configured to receive location/position information of the electronic device 1. The location/position information may include latitude and longitude coordinates and a height of a location/position of the electronic device 1.

In operation 63, environment information of the electronic device 1 is obtained based on the received location/position information of the electronic device 1 obtained in operation 62. The environment information may comprise temperature data, humidity data, pressure data, wind speed data, and/or wind direction data, and/or other meteorological variables, which may be obtained from a weather observation station. Using FIGS. 1 and 2 as an example, the network unit 32 may access a data base of the weather observation station which provides real-time meteorological monitoring data in a number of positions. The network unit 32 can therefore obtains the environment information from the data base according to the position indicated by the location/position information.

In operation 64, a local sound speed is determined according to the environment information obtained in operation 63. Using the embodiments of FIGS. 1 and 2 as an example, the sound speed converter 33 can determine the local sound speed by referring to a local sound speed look-up table LUT2 with the environmental data values received from the network unit 32. The local sound speed look-up table LUT2 can record local sound speeds corresponding to different environmental data values, for example, different temperatures. Afterwards, the local sound speed look-up table LUT2 feeds back the local sound speed corresponding to the environmental data values of the environment where the electronic device is currently located.

Alternatively, the sound speed converter 33 can determine the local sound speed by utilizing one or more formulas such as an equation $V=340+0.6*(T-15)$, in which V is the local sound speed, and T is the temperature of the position where the electronic device 1 is located. Any suitable formulas for converting the one or more environment values to the local sound speed can be employed as required by different designs and is not limited in the disclosure.

In the case that the network unit 32 is not able to access the Internet or is not implemented, the sound-speed converter 33 can obtain the local sound speed directly by using the positioning data values obtained from the positioning unit 31. In one embodiment, a temperature sensor is implemented in the electronic device 2, and it can provide a current temperature to the sound speed converter 33 to obtain the local sound speed by referring to a local sound speed look-up table LUT2 or by using one or more formulas. In another embodiment, the sound speed converter 33 may refer not only to a local sound speed look-up table LUT2 but also an environment value look-up table, both of which may be stored in a memory unit or any storage/circuit forms. The environment value look-up table may record long-term environment values such as average temperatures corresponding to different positions such as different altitudes or cities. On the other hand, the local sound speed look-up table LUT2 may record local sound speeds corresponding to different environment data values such as temperature values. By referring to the two look-up tables, the sound speed converter 33 may obtain the local sound speed corresponding to the environment values.

In operation 65, an object distance between the electronic device 1 and the object to be focused on can be determined according to the local sound speed and the travel time. Using the embodiments of FIGS. 1 and 2 as an example, the distance analyzer 26 can processes data/signals from the time analyzer 24 and the sound-speed converter 33 to determine the object distance between the electronic device 1 and the object to be focused on. In one embodiment, the distance analyzer 26 may determine the object distance using one or more formulas such as the equation $D=V*t$, in which D is the object distance, V is the local sound speed of the ultrasonic signal, and t is the travel time of the ultrasonic signal. In other embodiments, the distance analyzer 26 may determine the object distance by referring to one or more look-up tables, which can record different object distances corresponding to different local sound speeds.

In operation 66, the object distance can be provided for focusing on the object according to the object distance. In the focusing, one or more focusing parameters for focusing on the object are determined according to the object distance. The focusing parameters may include a number of motor steps or a focal distance. Using the embodiments of FIGS. 1 and 2 as an example, the data/signals produced by the distance analyzer 26 can be transmitted to the driving circuit 43 of the image capturing module 40. The driving circuit 43 can then determine the focusing parameters to actuate the lens driving module 42 to move the lens unit 41.

In one embodiment, the driving circuit 43 can determine the focusing parameters by referring to a motor-steps look-up table LUT3, which may be stored in a memory unit or implemented with any storage/circuit forms. The motor steps look-up table LUT3 may record different number of motor steps corresponding to different object distances. The number of motor steps corresponding to the object distance can therefore be obtained from the motor steps look-up table LUT3 and provided to the lens driving module 42 to control the lens focal length and/or the lens focus position of the lens unit 41. Once the object is in focus, subsequent image capturing procedures for the object can be performed by the image sensor 44 and an image processor 45. In another embodiment, the driving circuit 43 can calculate the focusing parameters by using one or more formulas according to the object distance obtained in operation 65.

It is noted that, on some occasions, the local sound speed look-up table LUT3 may be calibrated as required. This calibration may also be performed when the speed analyzer 30 cannot obtain the required information. For example, the calibration may be performed on occasions when the positioning unit 31 is not able to receive location/position information and that the network unit 32 is not able to access the Internet.

Figure 4:
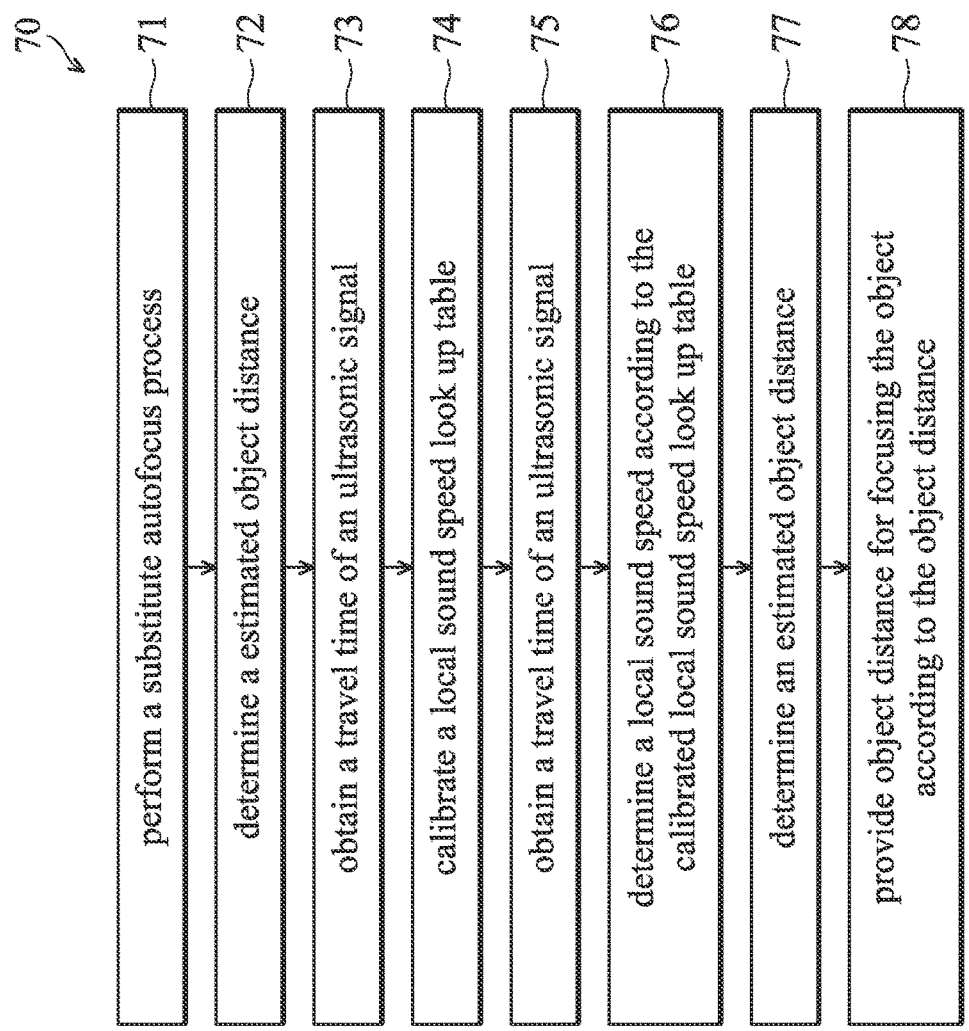
FIG. 4 is a flow chart illustrating an auto-focus method for focusing on an object using ultrasonic techniques, in accordance with one embodiment of the present disclosure.

FIG. 4 is a flow chart illustrating an auto-focus method 70 for focusing on an object using ultrasonic techniques, in accordance with some embodiments. For the purpose of explanation, the flow chart will be described along with the schematic views shown in FIGS. 1-2 but is not limited thereto. Although operations are illustrated as different and sequential blocks, they can be combined, replaced, reordered, or eliminated for different embodiments as required.

As mentioned, the auto-focus 70 may be performed when the sound speed look-up table needs to be calibrated or the positioning unit 31 is not able to receive location/position information, and when the network unit 32 is not able to access the Internet, the method 60 may not be performed to complete the focusing process. In this case, the system of the electronic device 1 utilizes the method 70 to calibrate the local sound speed look up table. In addition, the system can further focus an object by using the calibrated local sound speed look up table.

The method 70 can begin with an operation 71, in which a substitute auto-focus process is performed, for example, by a conventional/contrast focusing method. Accordingly, the focal distance or the number of motor steps can be obtained in arranging a position of the lens. The image capturing module 40 can drive the lens back and forth along the optical length to search for the best focus position.

For example, in the substitute auto-focus process, the image processor 45 may analyze the signal of each pixel produced by the image sensor 44 and the lens driving module 42 can move the lens unit 41 to different positions according to the analysis until the desired intensity difference between adjacent pixels is achieved.

In operation 72, an estimated object distance between the electronic device 1 and the reference object is determined. In the embodiment, the estimated object distance corresponding to the number of motor steps obtained in operation 71 can be obtained by referring to the motor steps look-up table LUT3. The operations 71 and 72 are reverse operations of operations 65 and 66.

In operation 73, a travel time of an ultrasonic signal is obtained. The travel time can be between a first point in time of the ultrasonic signal transmitted by the electronic device 1 and a second point in time of the ultrasonic signal, reflected from the reference object, received by the electronic device 1. Operation 73 may be performed in a similar way as operation 61, and the details will not be repeated herein for the purpose of brevity.

In operation 74, a local sound speed look-up table is calibrated according to the estimated object distance obtained in operation 72 and the travel time obtained in operation 73. For example, the estimated sound speed can be determined using the equation De=Ve*t, in which De is the estimated object distance, Ve is the estimated sound speed, and t is the travel time of the ultrasonic signal. In addition, an environment value such as a current temperature can be also detected by the electronic device 1. Afterwards, the local sound speed look-up table LUT2 is calibrated according to the estimated sound speed and the current temperature.

Once the local sound speed look-up table LUT2 is calibrated, subsequent focusing processes can be performed by using ultrasound rather than using the substitute autofocus process in operation 71. In the embodiment, the subsequent focusing processes using ultrasound include operations 75, 76, and 77.

In operation 75, a travel time of an ultrasonic signal can be obtained. The travel time may be between a first point in time of the ultrasonic signal transmitted by the electronic device 1 and a second point in time of the ultrasonic signal, reflected from another object, received by the electronic device 1. The other object can be the same or different from a reference object which has been focused on in the substitute autofocus process in operation 71. In the embodiment, details of operation 75 may be similar to those of operation 61, and they are omitted herein for the purpose of brevity. However, the disclosure should not be limited thereto.

In operation 76, a local sound speed can be determined according to the calibrated local sound speed look-up table. Details of operation 76 can be referred to operations 61-64, thus omitted here for brevity.

In operation 77, an estimated object distance between the electronic device 1 and the object to be focused on is determined. Details of operation 77 can be referred to operation 65, thus omitted here for brevity.

In operation 78, the object distance is provided for focusing on the object according to the object distance. In the focusing, one or more focusing parameters for focusing on the object are determined according to the estimated object distance. Details of operation 78 can be referred to operation 66, thus omitted here for brevity.

With these operations, the substitute auto-focus process can be performed only once for calibrating the local sound speed look-up table and the auto focus method using ultrasound can still be performed even in an environment without Internet access.

Figure 5:
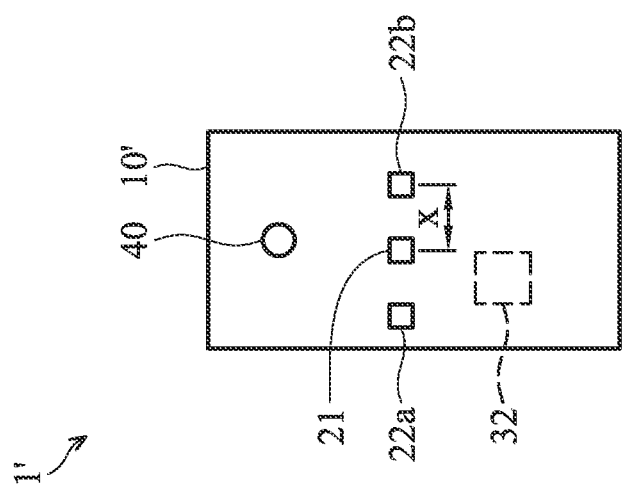
FIG. 5 shows a schematic view of an electronic device for capturing an image of an object, in accordance with one embodiment of the present disclosure.

FIG. 5 shows a schematic view of an electronic device 1' used in capturing an image of an object, in accordance with an embodiment of the present disclosure. In FIG. 5, elements similar to those of the electronic device 1 of FIG. 1 are provided with the same reference numbers, and the features thereof are not repeated in the interest of brevity.

In the embodiment of the present disclosure, differences between the electronic device 1' and the electronic device 1 includes the electronic device 1' including two receivers 22a and 22b for receiving the ultrasonic signal reflected back from the object to be focused on. The two receivers 22a and 22b may be positioned on two opposite sides of the transmitter 21 and each at a distance X from the transmitter 21.

Figure 6:
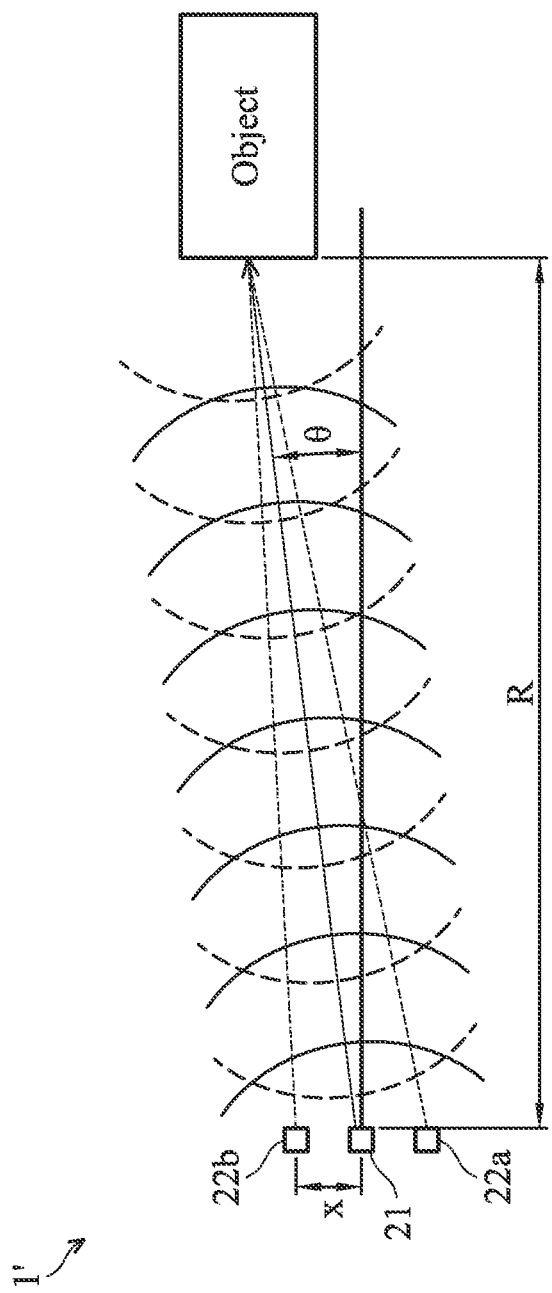
FIG. 6 shows a schematic view of an electronic device being used to measure an object distance between the electronic device and an object to be focused, in accordance with one embodiment of the present disclosure.

FIG. 6 illustrates how to measure the distance between the electronic device 1' and an object that is not positioned on a normal axis N that passes through the transmitter 21. The estimated object distance satisfies the following equation:

$$\tau(x_i, R, \Theta) = \frac{((X_i - R\sin\Theta)^2 + R^2\cos^2\Theta)^{1/2}}{c}$$

in which τ is the travel time between a transmission of the ultrasonic signal from the transmitter 21 and a receiving of the ultrasonic signal reflected from the object by one of the two receivers 22a and 22b, X is a distance between the transmitter 21 and one of the two receivers 22a and 22b, θ is an included angle between the object and the normal axis, and c is local sound speed as determined by operations 62-64 of FIG. 3. To focus on the object, operation 66 of FIG. 3 is performed, in which one or more focusing parameters for focusing on the object are obtained according to the estimated object distance.

An embodiment of the disclosure also provides a non-transitory storage medium or a computer-readable recording medium. The non-transitory storage medium records at least one program instruction or program code. After being loaded into an electronic device with a screen, the at least one program instruction or program code is executed to carry out the method provided by each embodiment described above.

For example, after the at least one program instruction or program code in the computer-readable recording medium is loaded into the electronic device 1 illustrated in FIG. 1 or 2, the electronic device 1 runs the at least one program instruction or program code to execute the method provided by any one of the embodiments described above. The computer-readable recording medium may be implemented as a memory accessible to electronic device 1 in FIG. 1 or 2. The computer-readable recording medium may be a read-only memory (ROM), a random-access memory (RAM), a CD-ROM, a tape, a floppy disk, or an optical data storage device.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

In the embodiments of the disclosure, the focusing can be performed more accurately and more quickly by utilizing the local sound speed, which may vary according to the environment where the electronic device is located. The local sound speed may be obtained by referring to a local sound speed look-up table or one or more formulas using environment information such as temperature. The one or more pieces of environment information can be obtained using positioning technologies such as GPS in some embodiments, and by positioning technologies in cooperation with network technologies such as the Internet in other embodiments. In addition, when GPS and/or the Internet are not available, a local sound-speed look-up table can still be calibrated and the auto focus method can still be performed. Consequently, the feasibility and accuracy of ultrasound focusing can be greatly improved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for focusing in an electronic device capable of capturing images, the method comprising:
   obtaining a travel time of an ultrasonic signal travelling to and from an object;
   obtaining either or both of location/position information and environment information of the electronic device;
   determining a local sound speed according to either or both of the location/position information and the environment information of the electronic device;
   determining an object distance between the electronic device and the object according to the local sound speed and the travel time; and
   focusing on the object according to the object distance.

2. The method as claimed in claim 1, wherein the obtaining either or both of location/position information and environment information of the electronic device comprises:
   receiving location/position information of the electronic device; and
   obtaining environment information of the electronic device based, at least in part, on the received location/position information of the electronic device.

3. The method as claimed in claim 2, wherein obtaining environment information of the electronic device based, at least in part, on the received location/position information of the electronic device comprises receiving the environment information of the electronic device corresponding to a location or position indicated by the location or the position information, by connecting to the Internet.

4. The method as claimed in claim 1, wherein the obtaining location/position information of the electronic device is performed by utilizing one or more of GPS, WiFi, BT beacon, GSM, GPRS, and WCDMA.

5. The method as claimed in claim 1, wherein the environment information comprises temperature data, humidity data, pressure data, wind speed data, and/or wind direction data.

6. The method as claimed in claim 1, wherein determining the local sound speed comprises referring to a local sound speed look-up table containing local sound speeds corresponding to different environmental data values.

7. The method as claimed in claim 1, wherein determining the local sound speed comprises determining the local sound speed according to a location/position indicated by the received location/position information.

8. The method as claimed in claim 1, further comprising adjusting a frequency and/or amplitude of the ultrasonic signal according to the travel time.

9. The method as claimed in claim 1, further comprising obtaining the number of motor steps or a focal distance for adjusting a lens according to the object distance.

10. The method as claimed in claim 9, wherein the obtaining the number of motor steps for adjusting the lens according to the object distance comprises referring to a motor steps look-up table containing the number of motor steps/focal distance corresponding to different object distances.

11. The method as claimed in claim 1, further comprising:
    obtaining an estimated object distance between the electronic device and the object by using a different focusing method;
    calibrating a local sound speed look-up table according to the estimated object distance and the travel time.

12. An electronic device, comprising:
    a sound speed analyzer configured to obtain a local sound speed according to either or both of location/position information and environment information of the electronic device; and
    an object distance detecting module comprising a transmitter configured to transmit an ultrasonic signal and a receiver configured to receive the ultrasonic signal, wherein the object distance detecting module is configured to obtain a travel time of the ultrasonic signal travelling to and from an object, detect an object distance between the electronic device and the object according to the local sound speed and the travel time of the ultrasonic signal, and provide the object distance for focusing on the object according to the object distance.

13. The electronic device as claimed in claim 12, wherein the object distance detecting module further comprises:
    a time analyzer configured to calculate the travel time between a transmitted time of the ultrasonic signal from the transmitter and a received time of the ultrasonic signal received by the receiver; and
    a distance analyzer configured to determine the object distance between the electronic device and the object according to the local sound speed provided by the sound speed analyzer and the travel time provided by the time analyzer.

14. The electronic device as claimed in claim 13, further comprising:
    a lens unit, comprising a lens; and
    a motor connected to the lens unit and configured to move the lens to focus on the object according to the object distance.

15. The electronic device as claimed in claim 12, wherein the sound speed analyzer comprises:
    a positioning unit, configured to receive the location/position information of the electronic device; and a sound speed converter configured to obtain the local sound speed according to the environment information which is obtained at least based on the location/position information.

16. The electronic device as claimed in claim 15, wherein the sound speed analyzer further comprises:
a network unit, configured to access a data base and obtain the environment information from the data base according to the location/position information.

17. The electronic device as claimed in claim 15, wherein the positioning unit comprises one or more of GPS, WiFi, BT beacon, GSM, GPRS, and WCDMA.

18. The electronic device as claimed in claim 12, wherein the environment information comprises temperature data, humidity data, pressure data, wind speed data, and/or wind direction data.

19. The electronic device as claimed in claim 12, wherein the object distance detecting module further comprises a signal corrector configured to adjust a frequency and/or amplitude of the ultrasonic signal transmitted by the transmitter according to the travel time.

20. The electronic device as claimed in claim 12, further comprising an image capturing module, configured to determine a focal distance or the number of motor steps according to the object distance and to focus the object using the focal distance or the number of motor steps.

21. An electronic device, comprising:
a time analyzer, configured to obtain a travel time of an ultrasonic signal travelling to and from an object;
a positioning unit, configured to receive location/position information of the electronic device;
a sound speed converter, configured to determine a local sound speed according to either or both of the location/position information and environment information of the electronic device; and
a distance analyzer, configured to determine an object distance between the electronic device and the object according to the local sound speed and the travel time, and provide the object distance for focusing on the object according to the object distance.

22. The electronic device as claimed in claim 21, further comprising a network unit, configured to obtain the environment information of the electronic device based, at least in part, on the received location/position information of the electronic device.

* * * * *